United States Patent
Yavuz et al.

(10) Patent No.: US 7,142,562 B2
(45) Date of Patent: Nov. 28, 2006

(54) ADAPTIVE DATA RATE CONTROL FOR MOBILE DATA TRANSFER FOR HIGH THROUGHPUT AND GUARANTEED ERROR RATE

(75) Inventors: Mehmet Yavuz, Plano, TX (US); David Paranchych, Richardson, TX (US)

(73) Assignee: Nortel Networks Limited, St. Laurent (CA)

( * ) Notice: Subject to any disclaimer, the term of this patent is extended or adjusted under 35 U.S.C. 154(b) by 910 days.

(21) Appl. No.: 10/186,787

(22) Filed: Jul. 1, 2002

(65) Prior Publication Data

US 2004/0001462 A1    Jan. 1, 2004

(51) Int. Cl.
H04J 3/16    (2006.01)

(52) U.S. Cl. .................. 370/468; 370/437; 370/329; 455/450

(58) Field of Classification Search .............. None
See application file for complete search history.

(56) References Cited

U.S. PATENT DOCUMENTS

| | | | | |
|---|---|---|---|---|
| 5,857,147 | A * | 1/1999 | Gardner et al. | 455/67.11 |
| 6,067,646 | A * | 5/2000 | Starr | 714/701 |
| 6,272,652 | B1 * | 8/2001 | Starr | 714/701 |
| 6,408,037 | B1 * | 6/2002 | Gienger | 375/340 |
| 6,546,509 | B1 * | 4/2003 | Starr | 714/704 |
| 6,571,104 | B1 * | 5/2003 | Nanda et al. | 455/522 |
| 6,751,187 | B1 * | 6/2004 | Walton et al. | 370/210 |
| 6,751,199 | B1 * | 6/2004 | Sindhushayana et al. | 370/252 |
| 6,760,313 | B1 * | 7/2004 | Sindhushayana et al. | 370/252 |
| 6,791,954 | B1 * | 9/2004 | Cheng et al. | 370/311 |

FOREIGN PATENT DOCUMENTS

| | | |
|---|---|---|
| WO | 0767 548 A | 4/1997 |
| WO | WO 97/34439 A | 9/1997 |
| WO | WO 01/82521 A2 | 11/2001 |

OTHER PUBLICATIONS

P. Bender et al., "CDMA/HDr: A Bandwidth-Efficiency High-Speed Wireless Data Service for Nomadic Users," IEEE Communications Magazine, pp. 70-77 (Jul. 2000).
A. Jalali et al., "Data Throughput of CDMA-HDR A High Efficiency-High Data Rate Personal Communication Wireless System," Qualcomm, Inc., San Diego, CA, USA.

* cited by examiner

Primary Examiner—Bob A. Phunkulh
(74) Attorney, Agent, or Firm—Trop, Pruner & Hu, PC

(57) ABSTRACT

A method and system applicable within a mobile transmission system for adaptively allocating a downlink data rate to an access terminal to compensate for channel fading. In accordance with the method of the present invention a downlink data rate is selected in accordance with a determined signal-to-noise level and an effective throughput, wherein the downlink data rate is associated with a specified signal-to-noise threshold to achieve a specified packet error rate. Next, a packet is transmitted to an access terminal at the selected downlink data rate. In response to successfully decoding the packet at the access terminal, the signal-to-noise threshold specified for the selected downlink data rate is decreased such that subsequent data rate selections are adaptively maximized. Responsive to a packet decoding error, the signal-to-noise threshold is abruptly increased to maintain the specified packet error rate.

18 Claims, 3 Drawing Sheets

30

| Data Rate [kbps] | Number of Slots [1 slot = 1.67ms] | Modulation Scheme | $I_C/I_O$ For 1% PER (dB) |
|---|---|---|---|
| 38.4 | 16 | QPSK | -13.5 |
| 76.8 | 8 | QPSK | -10.5 |
| 153.6 | 4 | QPSK | -7.4 |
| 307.2 | 2 | QPSK | -4.3 |
| 614.4 | 1 | QPSK | -1.0 |
| 307.2 | 4 | QPSK | -4.2 |
| 614.4 | 2 | QPSK | -1.2 |
| 1228.8 | 1 | QPSK | 3.7 |
| 921.6 | 2 | 8-PSK | 1.5 |
| 1843.2 | 1 | 8-PSK | 7.1 |
| 1228.8 | 2 | 16-QAM | 3.4 |
| 2457.6 | 1 | 16-QAM | 9.2 |

ADAPTIVE DATA RATE CONTROL FOR MOBILE DATA TRANSFER FOR HIGH THROUGHPUT AND GUARANTEED ERROR RATE

BACKGROUND OF THE INVENTION

1. Technical Field

The present invention generally relates to mobile telecommunications, and in particular to a method and system for adaptively adjusting the downlink transmission rate to a mobile access terminal. More particularly, the present invention relates to a method and system that compensates for channel fading by periodically adjusting the downlink transmission rate in accordance with on-going packet error rate analysis.

2. Description of the Related Art

Mobile wireless access to the Internet and other communications networks is under rapid development. The development of mobile data communications capability is due to, and is modeled to some extent in light of, the success and advantages provided by the advent and development of mobile wireless telecommunications for voice communications. Several new air interface standards have been or are being developed to enable high speed wireless access to the Internet. These standards use fast feedback from a mobile terminal regarding channel conditions, which enable the downlink data rate to be quickly changed to compensate for signal fading. The technology used in these standards is generally known as high data rate (HDR) technology. One of these standards is referred to as 1×EV-DO, which has evolved into the industry standard IS-856.

HDR technology is typically implemented utilizing a combination of Code Division Multiple Access (CDMA) and Time Division Multiple Access (TDMA) technologies. In CDMA, all users transmit simultaneously over the entire allocated bandwidth utilizing specialized spreading codes. In TDMA, users take turns accessing the channel utilizing multiple time slots that are allocated for transmission over a given channel bandwidth. In this manner, TDMA enables a single frequency to support allocation of multiple, simultaneous data channels to access terminals. As utilized herein, an access terminal is a mobile device such as a laptop computer, palm-pilot, etc., with the appropriate attachments that utilizes an air-interface to communicate with other terminals or network nodes via an access node, which is the air-interface network point-of-contact for any sending or receiving mobile terminal.

Existing HDR standards generally define two groups of channels, the to forward channel (referred to hereinafter as the downlink channel) and the reverse channel (referred to hereinafter as the uplink channel). The downlink channel, which communicates voice and data from the access node to mobile access terminals, carries traffic, a pilot signal, and overhead information. The pilot and overhead channels establish system timing and station identity. The uplink channel, which communicates voice and data from the access terminal to the access node, carries both traffic and signaling.

Unlike voice or two-way multi-media sessions, "data" sessions (e.g. Internet file downloads) are highly asymmetrical, with the downlink (i.e. the channel information transmitted from the access node to the access terminal) capacity being a disproportionately critical parameter. On the downlink of an HDR system, data may be transmitted in a time division multiplexed manner. The downlink capacity in HDR systems is measured, at least in part, in terms of the data rate allocated to the access terminal. In HDR implementations, interference caused by signals from other cells is a determinative factor in the allocation of a particular data rate to a given access terminal. Excessive signal interference can cause a failure in decoding a packet delivered from the access node to the access terminal. Such a failure results in the need to re-transmit the packet, resulting in a diminished data transmission efficiency. Therefore, downlink data rate selection is a key parameter in maintaining the efficiency of a given HDR channel.

The various 3GPP and 3GPP2 HDR standards, which use time division multiplexing of the downlink (HSDPA and 1×EV-DO, for example), require methods for determining the appropriate data rate allocated to an access terminal downlink. Generally, this requires that the access terminal perform a measurement of the current channel conditions in terms of the signal-to-interference-plus-noise ratio (SINR), which is a ratio of the energy-per-chip interval ($E_c$) of the allocated channel to the outside spectral interference plus thermal noise ($N_t$). In 1×EV-DO, once the SINR is measured, the access terminal must update the access network with data rate control (DRC) requests that map to a set of data rates in bits-per-second (bps). It is the responsibility of the access terminal to select a data rate appropriate to the received SINR, such that the resultant packet error rate (PER) falls within certain limits specified in the applicable minimum performance standard. In 1×EV-DO, the access node subsequently transmits data to the access terminal at the data rate specified by the DRC request. Therefore, in 1×EV-DO the data rate selection function typically resides in the access terminal. Once the access node has received the DRC request and determined that the access terminal should receive a packet, the access node transmits the packet over one or more time slots in accordance with the requested DRC rate.

Channel fading is a major source of channel signal strength fluctuations. So-called "slow fading" is caused by movement of the access terminal with respect to the access node (typically an RF transceiver station) resulting in interference in the air interface path between the access terminal and Access node due to changing physical topology (buildings, power lines, etc.). "Fast fading" is a phenomenon associated with collisions of multiple versions of the transmitted signal that arrive at the receiver at slightly different times and is typically characterized in terms of Doppler Effect and Rayleigh fading factors. HDR technology may compensate for channel fading by adding a built-in constant error margin into the computation of the downlink DRC request such that the data rate requested is a product of a very conservative estimate. Implementation of a downlink data rate based on such a conservative estimate results in wasted RF resources and reduced throughput. Alternatively, channel fading can be accounted for directly by modeling and predicting the channel fading that will occur for a given nomadic access terminal. Companies that provide wireless mobile communications are adopting ray tracing and Doppler Effect tools that attempt to compute the effects of channel fading in a complicated environment. Such methods present daunting computational objectives which require substantial and costly hardware and software overhead since these methods directly or indirectly must account for access terminal speed, access terminal location within a given sector (with respect to an access node), and line-of-sight information between the access terminal and the access node.

It can therefore be appreciated that a need exists for an improved approach to compensate for channel fading in the allocation of downlink channels in a mobile wireless environment. The present invention addresses such a need.

SUMMARY OF THE INVENTION

A method and system applicable within a mobile transmission system for adaptively allocating a downlink data rate to an access terminal to compensate for channel fading are disclosed herein. In accordance with the method of the present invention a downlink data rate is selected in accordance with a determined highest throughput, wherein the downlink data rate is associated with a specified signal-to-noise threshold to achieve a specified packet error rate. Next, a packet is transmitted to an access terminal at the selected downlink data rate. In response to successfully decoding the packet at the access terminal, the signal-to-noise threshold specified for the selected downlink data rate is decreased such that subsequent data rate selections are adaptively maximized. Responsive to a packet decoding error, the signal-to-noise threshold is abruptly increased to maintain the specified packet error rate. Such a method enables maximization of data throughput while observing a specified packet error rate.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

This invention is described in a preferred embodiment in the following description with reference to the figures. While this invention is described in terms of the best mode for achieving this invention's objectives, it will be appreciated by those skilled in the art that variations may be accomplished in view of these teachings without deviating from the spirit or scope of the present invention. Although, the present invention will be described herein in terms of a particular system and particular components, one of ordinary skill in the art will readily recognize that this method and system will operate effectively for other components in a data processing system.

Figure 1:
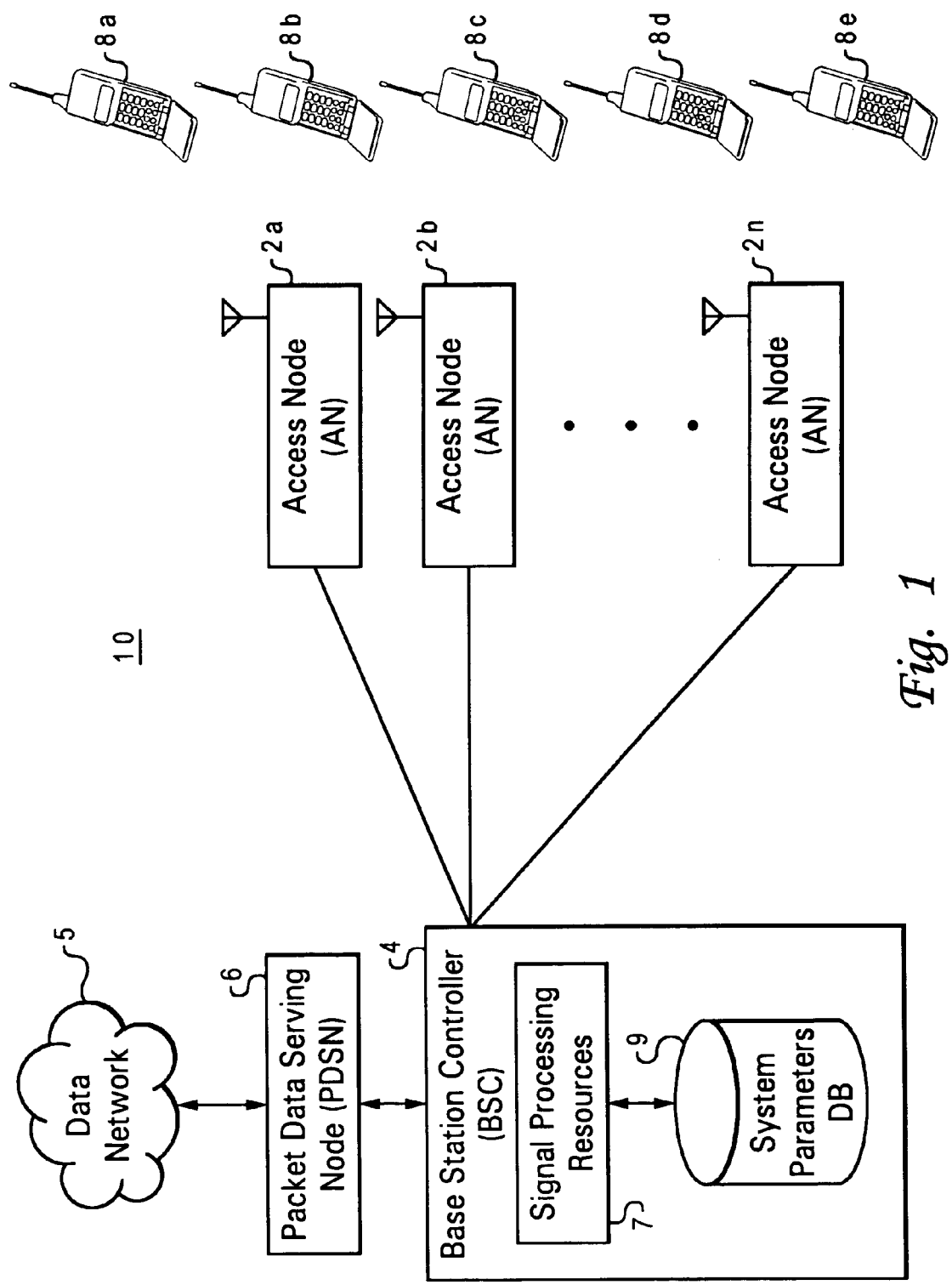
FIG. 1 depicts an illustrative embodiment of a wireless communication network with which the method and system of the present invention may advantageously be utilized.

Referring now to the drawings and in particular to FIG. 1, there is depicted a high-level diagram of a wireless communication network 10 in which a preferred embodiment of the present invention may advantageously be implemented. Wireless communication network 10 preferably employs a mobile air-interface digital protocol such as 1×EV-DO. As shown, wireless communication network 10 includes a packet data serving node (PDSN) 6 that supports various packet data session functions for a multiple-access technology such as 1×EV-DO, as well as connectivity to a packet switched data network (PSDN) 5, an example of which in the Internet.

Coupled to PDSN 6 is a base station controller (BSC) 4 that generally comprises signal processing resources 7, which may be implemented as one or more mid-range computer systems, and a system parameters database 9. BSC 4 controls the operation of multiple base transceiver stations, referred to herein generically as access nodes 2a–2n distributed at various locations within wireless communication network 10 in accordance with the system parameters stored in system parameters database 9. Within the service area of wireless communication network 10, there are also several mobile stations (referred to hereinafter as mobile access terminals) such as mobile access terminals 8a, 8b, 8c, 8d and 8e, which transmit and receive calls, pages, data and control messages over-the-air with access nodes 2a–2n. Although the present invention is described below with reference to mobile access terminals 8, those skilled in the art will appreciate from the following description that the present invention is also applicable to wireless local loop (WLL) implementations in which the subscriber units are generally fixed in a residence or business premises.

Figures 2, 3:
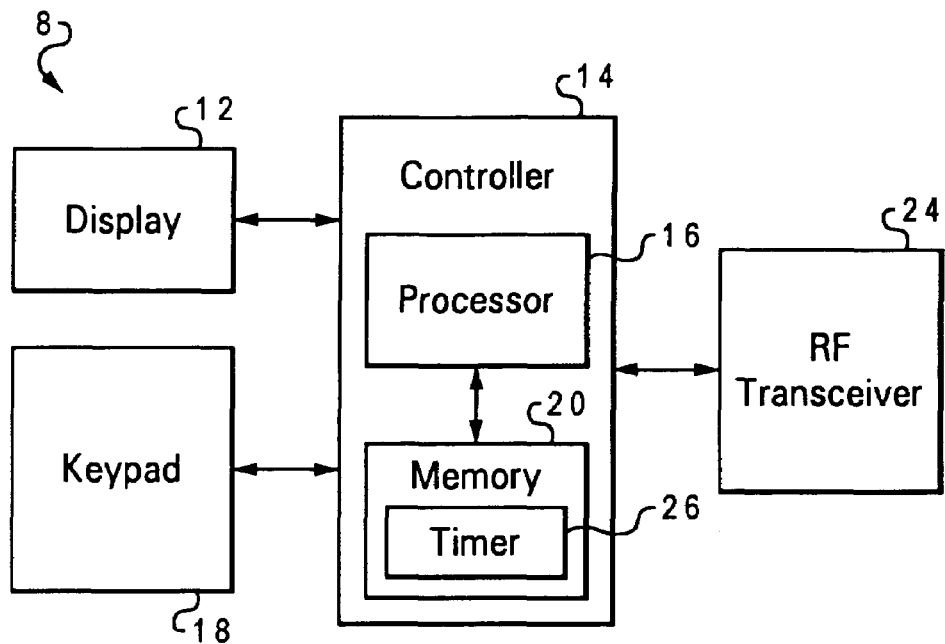
FIG. 2 is a high-level block diagram of a mobile access terminal that may be utilized in implementing the present invention.
FIG. 3 illustrates an exemplary data rate control table consisting of multiple data rate control sets that are selected and dynamically adjusted in accordance with the present invention.

Referring to FIG. 2, there is illustrated a high-level block diagram of a mobile access terminal 8 or other subscriber unit that may be utilized to implement the downlink data rate control method of the present invention. Mobile access terminal 8 includes a controller 14 that generally includes a processor 16 and a memory 20. Processor 16 executes a control program stored within memory 20 to implement the subscriber unit side of the downlink data rate control method employed by wireless communication network 10. Mobile access terminal 8 also has a keypad 18 by which the subscriber can enter keyed inputs, and a display 12 through which controller 14 can visually present alphanumeric and graphical outputs for viewing by the subscriber. Finally, mobile access terminal 8 includes a radio frequency transceiver 24 for sending (on an uplink channel) and receiving (on a downlink channel) wireless signals, including data messages, over-the-air.

Referring back to FIG. 1, BSC 4, in conjunction with access nodes 2a–2n, allocates downlink channels, which communicate data from access nodes 2a–2n to mobile access terminals 8a, 8b, 8c, 8d and 8e. Such downlink channels may carry traffic, a pilot signal, and overhead information. The pilot and overhead channels establish system timing and station identity. Pilot channel bursts are typically utilized as a signal strength reference that enables mobile access terminal 8 to estimate relevant channel conditions. In accordance with the embodiments depicted by the figures herein, a mobile access terminal may utilize the pilot burst to resolve the multipath components into an estimate of the signal-to-interference-plus-noise ratio (SINR) in terms of the signal energy ($E_c$) to RF interference ($N_t$).

Reverse, or "uplink" channels, are utilized to communicate data from mobile access terminals 8a, 8b, 8c, 8d and 8e to access nodes 2a–2n, and, like the downlink channels, carry both traffic and signaling. After sampling a pilot channel burst from a base transceiver station, the mobile access terminal estimates the current SINR conditions and delivers channel state information in the form of a data rate request to the base transceiver station utilizing an uplink data rate control (DRC) channel.

A recently developed mobile data communications capability for use within mobile network environments, such as wireless communication network 10, is known as high data rate (HDR) service with time division multiplexing coding techniques such as TDMA. Current HDR implementations utilize selectable DRC sets that provide the mobile access terminal with a tabularized selection criteria by which a downlink data rate is selected. In a fading channel environment, the necessary SINR threshold increases (with respect to static Additive Wide Gaussian Noise conditions) to maintain a specified PER. The present invention provides an efficient means by which a mobile access terminal can effectively map the received SINR measurement to a DRC rate option in a manner that maximizes allocated downlink bandwidth while maintaining the requisite PER in a fading channel environment.

As explained in further detail with reference to FIGS. 3 and 4, the method and system of the present invention are applicable within mobile communication system 10 and mobile access terminal 8 to provide a means for efficiently allocating and dynamically adjusting a downlink data rate in view of periodic SINR estimates performed by mobile access terminal 8. In particular, the present invention is directed to improving downlink channel bandwidth allocation for high speed packet-based data transmission in a mobile environment such as that depicted in FIG. 1.

With reference to FIG. 3, there is illustrated an exemplary data rate control table consisting of multiple data rate control sets that are selected and dynamically adjusted in accordance with the present invention. Specifically, a DRC table 30 is depicted which includes twelve selectable DRC sets. As shown in FIG. 3, each DRC set includes a specified data rate (in kbps) associated with a particular SINR, expressed as an $E_c/N_t$ threshold, that is required to achieve a specified packet error rate (PER) of 1% for AWGN channel conditions. For example, the lowest selectable data rate (38.4 kbps) within DRC table 30 is associated with the lowest $E_c/N_t$ threshold (−13.5 dB) within a discrete DRC set 32 to meet the 1% PER requirement. Modulation scheme and number of time slots are also included as metric guidelines and limitations within each DRC set. The inclusion of time slot specification within DRC table 30 is a reflection of the nature of current HDR implementations in which the HDR downlink to transmissions are time-multiplexed. Although the depicted DRC sets include slot number and modulation scheme metrics, it should be borne in mind that the present invention can be implemented in a much simpler tabular association between only selectable data rates and $E_c/N_t$ thresholds. It should be further noted that the particular values depicted in DRC table 30 correspond to static AWGN channel conditions (as set in initializing a channel, for example). As explained in further detail herein below, the present invention enables optimum selection and adaptive adjustment of the threshold data sets within a DRC table such as DRC table 30.

DRC table 30 may be utilized in downlink data rate allocation as part of a standardized DRC mechanism. One such mechanism, 1×EV-DO, is a newly developing wireless standard based on HDR technology and is optimized for wireless Internet services. In accordance with current HDR/DRC technology, an access terminal selects from among the available data rates within DRC table 30 by comparing measured channel conditions to the $E_c/N_t$ threshold values provided in DRC table 30 and selecting one of the DRC sets accordingly. Although DRC table 30 may typically be included within memory 20 of mobile access terminal 8, it is possible to maintain the DRC table within access nodes 2a–2n or BSC 4. The methods by which the DRC sets are selected and dynamically adjusted are described in further detail with reference to FIG. 4 below.

Figure 4:
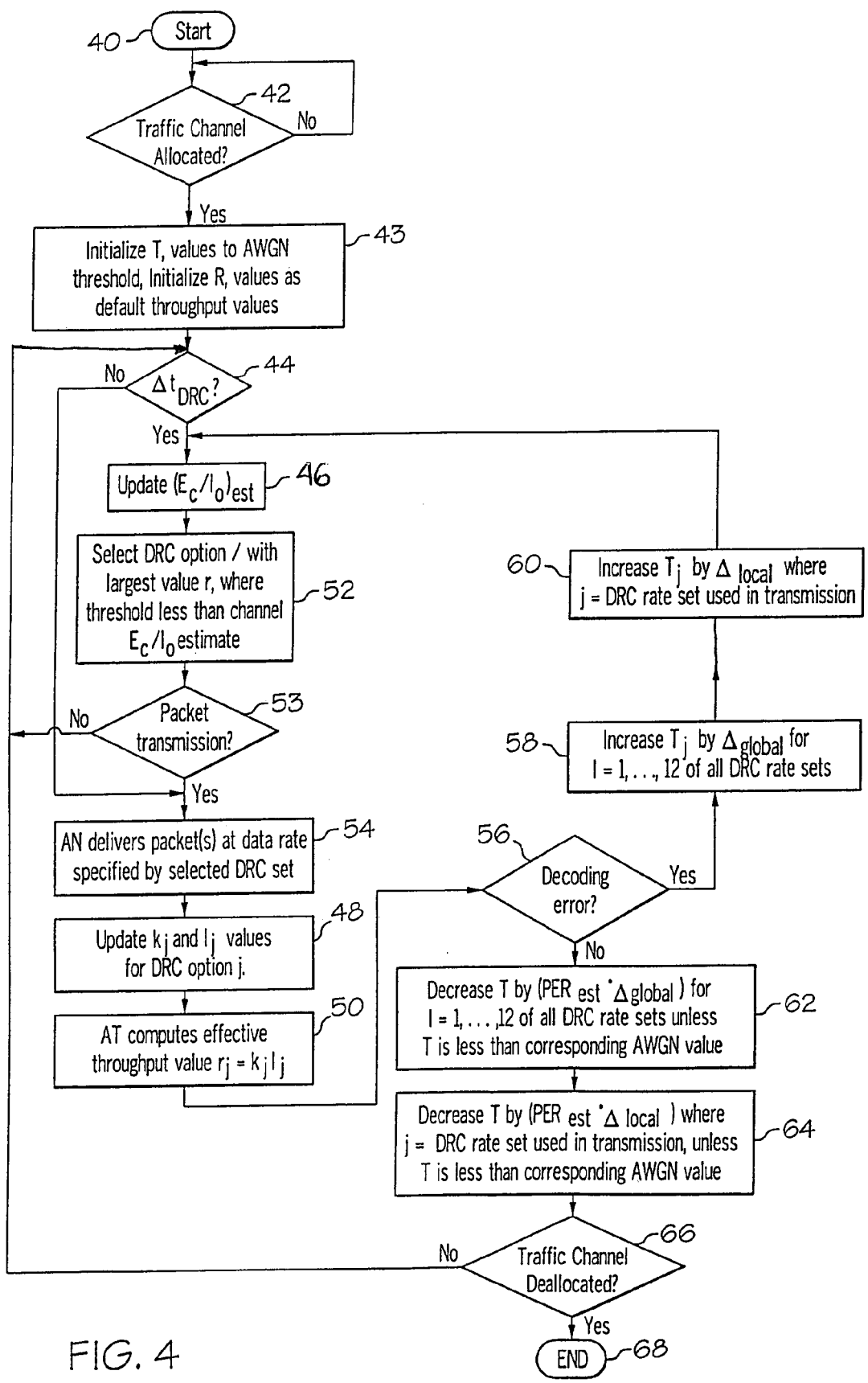
FIG. 4 is a flow diagram depicting steps performed during adaptive allocation of a downlink data rate in accordance with a preferred embodiment of the present invention.

With reference now to FIG. 4, there is depicted a flow diagram illustrating steps performed by processor 16 contained within mobile access terminal 8 and/or signal processing resources 7, during adaptive allocation of a downlink data rate in accordance with a preferred embodiment of the present invention. The downlink data rate allocation process begins as shown at step 40, and proceeds to step 42 with a determination of whether a downlink traffic channel has been allocated by BSC 4 to mobile access terminal 8 via access node 2. After a traffic channel is allocated, initialization is performed, setting default throughput and threshold values as depicted at step 43. As illustrated at steps 44 and 46, while a downlink traffic channel is allocated, a periodic SINR estimate is performed by mobile access terminal 8 at a specified interval, AtDRC. This estimate is followed by a DRC request that is formulated in accordance with the remaining steps in the process.

Although not expressly depicted in FIG. 4, the values within each of the DRC sets within DRC table 30 are initialized to pre-specified values (static AWGN, for example). The data rate control mechanism described with reference to FIG. 4 enables a mobile access terminal to select among the DRC sets within a DRC table, and furthermore to adaptively adjust DRC set parameters to account for changing channel conditions such as channel fading without unduly limiting the allocated downlink bandwidth.

Before explaining the process of a preferred embodiment as depicted in FIG. 4, the concept of maximum throughput is discussed. On the forward link of 1×EV-DO the throughput experienced by a single user can be expressed as:

$$T(P) = \frac{\sum_{i=0}^{12} k_i P_i}{\sum_{i=0}^{12} l_i P_i}$$

where $k_i$ correspond to the average successfully transmitted number of bits for DRC options i=0,1, ..., 12 and $l_i$ denotes the average number of slots used per DRC option. Lastly $P_i$ denotes the probability that DRC option i would be used. Note that due to H-ARQ mechanism $l_i$ can be less than the nominal number of slots displayed in FIG. 3 and due to packet errors $k_i$ can be less than the bits per packet in FIG. 3 for some DRC options.

For uncorrelated channels (i.e.: high Doppler speeds) $k_i$, $l_i$, and $P_i$ in (1) become independent from each other and it can be shown that maximum throughput can be achieved by always choosing the data rate with highest $k_i/l_i$ ratio. This makes sense because each DRC option results in an effective throughput of $k_i/l_i$. If the DRC with highest $k_i/l_i$ ratio does not satisfy the PER requirement, then one may need to pick from multiple DRC options with different $k_i/l_i$ ratios.

For correlated channels (i.e.: slow and moderate Doppler speeds), $k_i$, $l_i$ and $P_i$ are not independent from each other and it becomes much more complicated to find the optimal DRC options for maximum throughput while maintaining a certain PER. Moreover, as mentioned above, the optimum DRC options will depend on (speed, average $E_c/N_t$ and Rician fading K factor etc.).

Continuing with FIG. 4, following the SINR update at step 46, mobile access terminal 8 updates the computed throughput for the current DRC option. Access terminal 8 selects the DRC option with the largest effective throughput which has a threshold less than the channel $E_c/N_t$ estimate as illustrated at step 52. Packet transmission is determined as depicted at step 53. If a packet has not been transmitted the process continues to step 44. Otherwise, the process advances to step 54.

During each DRC interval, packets are transmitted (determined at step 53) on the allocated downlink air-channel in accordance with the values specified in the selected DRC set as depicted at step 54. Afterwards, the k and l values for determining the throughput for the current DRC option are determined as illustrated at step 48. Following the determination of k and l, access terminal 8 updates the effective throughput as depicted at step 50. The effective throughput may be calculated as r=k/l. As illustrated at steps 56, 58, and 60, in the case of an unsuccessful packet transmission (i.e. mobile access terminal 8 is unable to successfully decode the packet), the threshold for the current DRC option ($T_j$) is increased by the amount $\Delta_{local}$ and the threshold for all DRC data rates ($T_i$) is increased by the amount $\Delta_{global}$. Conversely, as depicted at steps 56, 62, and 64, for each packet that is successfully transmitted to mobile access terminal 8, the SINR thresholds specified within DRC table 30 are decreased to maximize the available data rate bandwidth while maintaining the specified PER under fading channel conditions. The threshold for the current DRC option ($T_j$) is decreased by the amount $PER_{set}*\Delta_{local}$, and the threshold for all DRC data rates ($T_i$) is decreased by the amount $PER_{set}*\Delta_{global}$.

The selection of a particular DRC set (performed in accordance with steps 44, 46, 48, 50, and 52), the transmission of packets (step 54), and the subsequent SINR threshold adjustments continue until the downlink traffic channel is deallocated at step 66, terminating the process as shown at step 68. It should be noted that although the SINR thresholds are adjusted during a given data session, the initial values (such as those depicted in FIG. 3) are maintained in memory and restored as initialization values upon a subsequent channel allocation to mobile access terminal 8.

A method and system have been disclosed for adaptively selecting and adjusting data rate control parameters within a mobile data transfer system. Software written according to the present invention is to be stored in some form of computer-readable medium, such as memory, CD-ROM or transmitted over a network, and executed by a processor. Alternatively, some or all of the present invention could be implemented in hardware. Additionally, while the present invention has been described in conjunction with the 1×EV-DO standard, it is equally applicable to the 1×EV-DV and HSPDA standards. Further, one of ordinary skill in the art will readily understand that the present invention may be implemented on an access node or access terminal.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method applicable within a mobile communication system for adaptively allocating a downlink data rate to an access terminal to compensate for channel fading, said method comprising:
   selecting a downlink data rate in accordance with a determined signal-to-noise level and a determined effective throughput, wherein said downlink data rate is associated with a specified signal-to-noise threshold to achieve a specified packet error rate;
   receiving a packet by the access terminal at said selected downlink data rate; and
   responsive to successfully decoding said packet, decreasing the signal-to-noise threshold specified for said selected downlink data rate,
   wherein said determined effective throughput is computed in accordance with the relation:

$$r_j = k_j/l_j$$

wherein $r_j$ represents the effective throughput, $k_j$ corresponds to an average successfully transmitted number of bits, and $l_j$ denotes the average number of slots used.

2. The method of claim 1, wherein said determined signal-to-noise level at said access terminal is a ratio of the signal strength of an allocated access terminal channel to the combined external signal strength plus thermal noise.

3. The method of claim 1, wherein said selecting a downlink data rate is preceded by determining a signal-to-noise level at said access terminal.

4. The method of claim 1, wherein said selecting a downlink data rate comprises:
   comparing said determined effective throughput with a plurality of effective throughput values, wherein each of said plurality of effective throughput values is associated with a corresponding downlink data rate and a signal-to-noise level; and
   selecting a highest downlink data rate corresponding to one of said plurality of effective throughput values that has a highest effective throughput where said associated signal-to-noise level does not exceed said determined signal-to-noise level.

5. The method of claim 1, further comprising:
   responsive to unsuccessfully decoding said packet, increasing the signal-to-noise threshold specified for said selected downlink data rate.

6. The method of claim 5, wherein said increasing the signal-to-noise threshold specified for said selected downlink data rate comprises:
   computing an increased signal-to-noise threshold specified for said selected downlink data rate in accordance with the relation:

$$T = T_j + \Delta_{local}$$

wherein T represents the increased signal-to-noise threshold associated with the selected downlink data rate, $T_j$ represents the current signal-to-noise threshold value associated with the selected downlink data rate, and $\Delta_{local}$ represents a local data rate control delta value.

7. The method of claim 6, wherein said mobile communication system includes selectable data rate control sets in which each of said plurality of signal-to-noise threshold values is associated with a corresponding downlink data rate for said specified packet error rate, said method further comprising:
   responsive to unsuccessfully decoding said packet, increasing each of said plurality of signal-to-noise threshold values in accordance with the relation:

$$T = T_i + \Delta_{global}$$

wherein T represents the increased value for the $i^{th}$ signal-to-noise threshold value among said plurality of signal-to-noise threshold values, $T_i$ represents current value for the $i^{th}$ signal-to-noise threshold value among said plurality of signal-to-noise threshold values, and $\Delta_{global}$ represents a global data rate control delta value.

8. The method of claim 1, wherein said decreasing the signal-to-noise threshold specified for said selected downlink data rate comprises: computing a decreased signal-to-noise threshold specified for said selected downlink data rate in accordance with the relation: $T=T_j-(PER*\Delta_{local})$
wherein T represents the decreased signal-to-noise threshold value associated with the selected downlink data rate, $T_j$ represents the current signal-to-noise threshold value associated with the selected downlink data rate, PER represents said specified packet error rate, and $\Delta_{local}$ represents a local data rate control delta value.

9. The method of claim 8, wherein said mobile communication system includes selectable data rate control sets in which each of said plurality of signal-to-noise threshold values is associated with a corresponding downlink data rate for said specified packet error rate, said method further comprising:
responsive to successfully decoding said packet, decreasing each of said plurality of signal-to-noise threshold values in accordance with the relation:

$$T=T_i-(PER*\Delta_{global})$$

wherein T represents the decreased signal-to-noise threshold, $T_i$ represents the $i^{th}$ signal-to-noise threshold value among said plurality of signal-to-noise threshold values, PER represents said specified packet error rate, and $\Delta_{global}$ represents a global data rate control delta value.

10. A mobile communication system for adaptively allocating a downlink data rate to an access terminal to compensate for channel fading, said mobile communication system comprising:
a processor to select a downlink data rate in accordance with a determined signal-to-noise level and a determined effective throughput, wherein said downlink data rate is associated with a specified signal-to-noise threshold to achieve a specified packet error rate;
an air-interface transceiver to transmit a packet to an access terminal at said selected downlink data rate; and
the processor responsive to successfully decoding of said packet for decreasing the signal-to-noise threshold specified for said selected downlink data rate,
wherein said determined effective throughput is computed in accordance with the relation:

$$r_j=K_j/l_j$$

wherein $r_j$ represents the effective throughput, $k_j$ corresponds to an average successfully transmitted number of bits, and $l_j$ denotes the average number of slots used.

11. The mobile communication system of claim 10, wherein said determined signal-to-noise level at said access terminal is a ratio of the signal strength of a pilot channel to the combined external signal strength plus thermal noise.

12. The mobile communication system of claim 10, further comprising signal detection means for determining a signal-to-noise level at said access terminal.

13. The mobile communication system of claim 10, wherein said processor selects the downlink data rate by
comparing said determined effective throughput with a plurality of effective throughput values, wherein each of said plurality of effective throughput values is associated with a downlink data rate and a signal-to-noise level; and
selecting a highest downlink data rate corresponding to one of said plurality of effective throughput values that has a highest effective throughput where said associated signal-to-noise level does not exceed said determined signal-to-noise level.

14. The mobile communication system of claim 10, wherein the processor is responsive to unsuccessfully decoding of said packet for increasing the signal-to-noise threshold specified for said selected downlink data rate.

15. The mobile communication system of claim 14, wherein said processor increases the signal-to-noise threshold specified for said selected downlink data rate by
computing an increased signal-to-noise threshold specified for said selected downlink data rate in accordance with the relation:

$$T=T_j+\Delta_{local}$$

wherein T represents the increased signal-to-noise threshold associated with the selected downlink data rate, $T_j$ represents the current signal-to-noise threshold value associated with the selected downlink data rate, and $\Delta_{local}$ represents a local data rate control delta value.

16. The mobile communication system of claim 15, further comprising memory containing selectable data rate control sets in which each of said plurality of signal-to-noise threshold values is associated with a corresponding downlink data rate for said specified packet error rate, wherein
the processor is responsive to unsuccessfully decoding of said packet by increasing each of said plurality of signal-to-noise threshold values in accordance with the relation:

$$T=T_i+\Delta_{global}$$

wherein T represents the increased value for the $i^{th}$ signal-to-noise threshold value among said plurality of signal-to-noise threshold values, $T_i$ represents current value for the $i^{th}$ signal-to-noise threshold value among said plurality of signal-to-noise threshold values, and $\Delta_{global}$ represents a global data rate control delta value.

17. The mobile communication system of claim 10, wherein said processor decreases the signal-to-noise threshold specified for said selected downlink data rate by
computing a decreased signal-to-noise threshold specified for said selected downlink data rate in accordance with the relation:

$$T=T_j-(PER*\Delta_{local})$$

wherein T represents the decreased signal-to-noise threshold value associated with the selected downlink data rate, $T_j$ represents the current signal-to-noise threshold value associated with the selected downlink data rate, PER represents said specified packet error rate, and $\Delta_{local}$ represents a local data rate control delta value.

18. The mobile communication system of claim 17, further comprising memory for storing selectable data rate control sets in which each of said plurality of signal-to-noise threshold values is associated with a corresponding downlink data rate for said specified packet error rate wherein
the processor is responsive to successfully decoding of said packet by decreasing each of said plurality of signal-to-noise threshold values in accordance with the relation:

$$T=T_j-(PER*\Delta_{global})$$

wherein T represents the decreased signal-to-noise threshold, $T_i$ represents the $i^{th}$ signal-to-noise threshold value among said plurality of signal-to-noise threshold values, PER represents said specified packet error rate, and $\Delta_{global}$ represents a global data rate control delta value.

* * * * *